May 6, 1941.  M. J. P. BOGART ET AL  2,240,752
METHOD OF DISTILLATION
Filed April 14, 1938   2 Sheets-Sheet 1
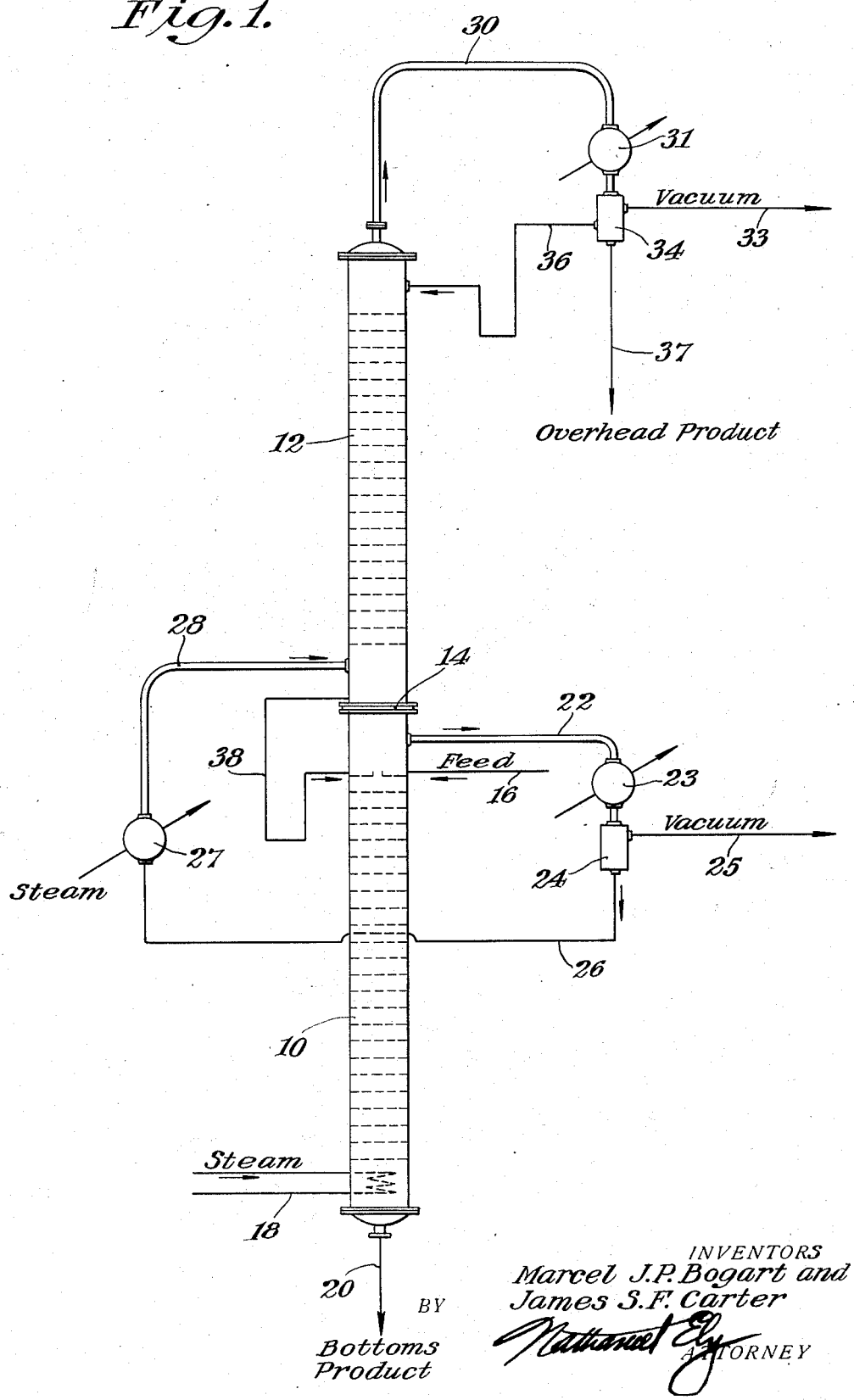

May 6, 1941.    M. J. P. BOGART ET AL    2,240,752
METHOD OF DISTILLATION
Filed April 14, 1938    2 Sheets-Sheet 2
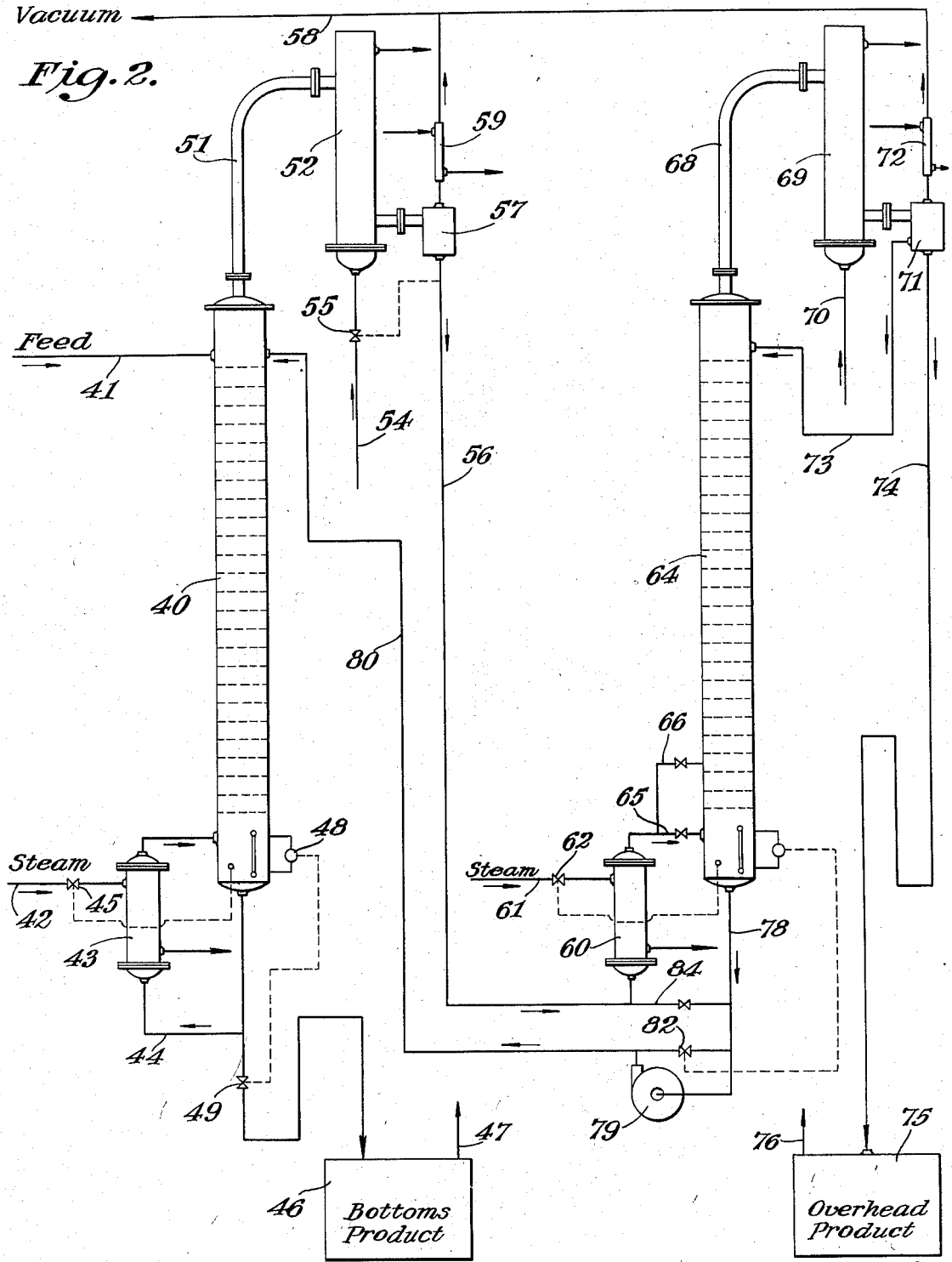
INVENTORS
Marcel J. P. Bogart and
BY   James S. F. Carter
Nathaniel Ely
ATTORNEY Patented May 6, 1941

2,240,752

UNITED STATES PATENT OFFICE 2,240,752

METHOD OF DISTILLATION

Marcel J. P. Bogart, Teaneck and James S. F. Carter, Passaic, N. J., assignors, by mesne assignments, to Heyden Chemical Corporation, New York, N. Y., a corporation of New York Application April 14, 1938, Serial No. 201,864

1 Claim. (Cl. 202—52)

This invention relates to the separation, by distillation, of a mixture of liquids having relatively close boiling points.

The separation of liquid mixtures, the components of which have relatively close boiling points or have vapor pressure curves which tend to converge under increasing pressures, has been difficult due to the fact that a large number of bubble decks is required and the pressure drop requires a pressure approaching or equal to a critical point at which separation is impossible. Furthermore, the pressure limits of a large number of decks require an excessively high temperature heating medium for the high pressures and an extremely low temperature for the low pressures which has added to the operating difficulties. Some mixtures have thus proved commercially inseparable.

One of the principal objects of this invention is to provide an improved method by which the separation of close boiling point products is made possible and by which a more accurate control can be had and operating costs materially reduced.

Another object of the invention is to provide an improved method of separating mixtures of relatively close boiling point materials in which a complete separation of one end product is obtained in a primary distillation step and a complete separation of another end product is obtained in a subsequent distillation step with the overhead from the first distillation step condensed so that there is a minimum difference in pressures between the respective ends of the distillation zones.

Another object of the invention is to provide an improved method of distilling close boiling point materials in which the distillation takes place in a plurality of steps with the bottoms product of the subsequent step used as reflux for the initial step and with the bottoms product of the first step and the overhead product of the subsequent step constituting the end products.

A still further object of the invention is to provide an improved distillation apparatus having a large number of individual decks so interconnected as to provide a relatively low maximum pressure drop between the top and the bottom of the distillation zones.

Further objects and advantages of our invention will appear from the following description of a preferred form of embodiment thereof taken in connection with the attached drawings, in which:

Figure 1 is a diagrammatic layout of a single two-part column in accordance with our invention; and Figure 2 is a diagrammatic layout of a plurality of single step columns as a modified form of embodiment of the invention.

In accordance with a preferred form of embodiment of our invention, we have shown a distilling column having a primary distillation section 10, and a secondary distillation section 12 which may be mounted on top of the primary distillation section 10, but which is entirely separated therefrom as by the closed plate section 14. The feed, which is a mixture of products having relatively close boiling points, is preferably introduced at 16 or at any other point in the two distillation zones. It is most satisfactory, however, when introduced into that part of the distillation zone having materials most nearly approaching the relative proportion of the mixed materials.

Heat may be provided by the steam circuit 18, conveniently mounted in the bottom of the primary distillation section. The bottoms product is removed at 20.

The overhead in the primary distillation section 10, is removed through the vapor pipe 22 and completely condensed by the condenser 23. The liquid condensate is fully separated in the separator 24 on which a vacuum is maintained by the vacuum line 25. The condensate is then drawn off at 26 and passed through the heat exchanger 27 and vaporized. The vapor is introduced into the bottom of the secondary distillation zone 12 through the vapor line 28.

The secondary distillation step of this condensate removed overhead from the first distillation is carried out in the secondary distillation zone 12 with the overhead removed at 30 and passed through condenser 31. This is also operated under vacuum obtained by the vacuum line 33 operating on the separator 34. Reflux is returned at 36 to the top of the secondary distilling section 12, and the overhead product is removed at 37. The bottoms are passed into the first distillation zone 10 through pipe 38 and this serves as reflux.

It will be seen that the mixture is thus given a two-step separation in the respective distillation sections. The maximum differences in pressure between the top and bottom of the respective distillation sections due to pressure drop through the multiplicity of decks is not great, however, as each section is subjected to a vacuum which is possible by the condensation of the overhead vapors in each section. It is possible, under such circumstances, to obtain a complete separation of the bottoms product at 20 as a result of the first distillation and a complete and pure overhead product can be produced at 37 as the overhead from the secondary distillation.

This is of especial advantage where the boiling points of the mixed products are relatively close together and where the vapor pressure curves tend to converge at the higher pressures. As is well known, for example, with such mixtures as chlorinated toluenes, the parachlortoluene and the orthochlortoluene can be effectively separated only at relatively low absolute pressures. With the apparatus as described, the pressure drop in each distillation zone can be kept at a minimum with the resulting substantially lower total pressure drop. As a specific example, it is possible to reduce the usual required pressure range of 50 mm. to 330 mm. when one hundred and forty decks are used to a range of 50 mm. to 190 mm. in each section of seventy decks. Not only does this improved pressure range make separation of difficultly separable products possible, but it also materially reduces operating costs. Necessarily the heat input at 18 must exceed in temperature the boiling point of the mixture at the higher pressure. In a similar manner, the cooling medium introduced to the condenser 31 must be lower in temperature than the condensing temperature of the vapors under the relatively low pressures. For this reason added economies in operation are possible with a smaller temperature range possible by the dependent distillation sections.

If it should be found desirable to subdivide the column, it is of course entirely practical to do so. An arrangement which shows such a construction is illustrated in Figure 2. The primary column 40 is adapted to receive feed at 41 of a mixture of closely boiling materials as in the first case, and such materials are initially distilled within this column. Heat is conveniently supplied by the steam line 42 in heat exchange relation in heat exchanger 43 with a bottoms reboiling circuit 44 and with the steam under automatic control 45.

A part of the bottoms material is collected at 46 in a bottoms chamber having a vacuum vent 47. The liquid level in the bottom of the primary distillation column 40 is under control of the liquid level control 48 which operates the valve 49 on the bottoms product discharge line. The remainder of the bottoms material is recirculated at 44 for heating as above described.

The overhead vapors from the primary column are discharged at 51 into the total condenser 52, the temperature of which is maintained uniform by the incoming cooling medium 54, under temperature control 55 operated from the condensate line 56. The condensate from the condenser 52 is separated from the uncondensable gas in the liquid separator 57 which is under vacuum from the line 58. A vent cooler 59 may be placed in this line to assure the complete separation of liquid from the gases.

The condensate removed at 56 is again distilled for the complete removal of the second end product. This is accomplished by heating the condensate in the heat exchanger 60 and introducing vapors into the secondary distillation column 64. The vapors may be introduced at 65 or 66 depending on whether or not some separation is desired between the feed and the bottoms material. As in the prior case, the heating of the feed is conveniently accomplished by passing the condensate through a heat exchanger 60 which is effectively heated by steam introduced at 61 and under control of pressure control valve 62. The bottoms product removed at 78 may be in part circulated through the heat exchanger 60 under suitable control of valve 84.

In this second distillation column, the vapors which are removed overhead at 68, are condensed at 69 by a cooling medium 70 and the liquid is separated from the uncondensable gases in the separator 71 which is under a vacuum from line 58. A vent cooler 72 may also be placed in the vacuum line. The liquid removed through the line 74 becomes the final overhead end product which is conveniently collected at 75 in a suitable chamber having the vacuum vent 76.

A part of the bottoms from the second column 64, removed at 78, is conveniently pumped by the pump 79 as reflux through the line 80 to the top of the first column 40. If desired, an automatic liquid level control valve 82 may be provided in this line. It is to be understood, however, that the reflux need not be continuously withdrawn from the second column for return to the first, but that reflux liquid may be collected from any desired source and returned as needed. Similarly, the operation of the second column need not be precisely dependent on the first column as the intermediate liquid mixture removed at 56 may be accumulated and introduced as desired to the second column. There are definite advantages, however, in having a continuous automatic separation.

The invention is applicable to the separation of other chemical substances and more than two steps may be found to be technically desirable. The selection of a multiple section single column or a plurality of columns operating under substantially equal vacuum will depend to a large extent on the materials to be separated and practical factors such as the cost of high columns as compared to the costs of a multiplicity of columns.

While we have shown a preferred form of embodiment of the invention, we are aware that modifications may be made thereto without departing from the scope and spirit of the invention disclosed herein; therefore, only such limitations as appear in the claim appended hereinafter should be imposed.

We claim:

The method of separating a mixture of para- and ortho-chlortoluene into its constituents in a state of substantial purity, the steps which comprise feeding the mixture to a first distillation zone, maintaining said first zone under a vacuum, condensing the overhead from the first zone, revaporizing this overhead condensate, feeding the vapors to the bottom of a second distillation zone, maintaining said second zone under a substantially equal vacuum, condensing the overhead from the second zone, refluxing the second zone with a portion of the overhead condensate therefrom, removing the remainder of this overhead condensate as substantially pure orthochlortoluene, withdrawing the bottoms from the second zone, and refluxing the first zone therewith, and withdrawing the bottoms from the first zone as substantially pure parachlortoluene.

MARCEL J. P. BOGART.
JAMES S. F. CARTER.